US010849284B2

(12) United States Patent
Holman

(10) Patent No.: US 10,849,284 B2
(45) Date of Patent: *Dec. 1, 2020

(54) STUMP GRINDER WITH CUTTING WHEEL MOVING AND STABILIZING ASSEMBLY

(71) Applicant: Diamond Mowers, LLC, Sioux Falls, SD (US)

(72) Inventor: Jerry D. Holman, Lakeville, MN (US)

(73) Assignee: Diamond Mowers, LLC, Sioux Falls, SD (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/296,788

(22) Filed: Mar. 8, 2019

(65) Prior Publication Data

US 2019/0200544 A1 Jul. 4, 2019

Related U.S. Application Data

(63) Continuation of application No. 15/197,869, filed on Jun. 30, 2016, now Pat. No. 10,278,340.

(60) Provisional application No. 62/197,870, filed on Jul. 28, 2015.

(51) Int. Cl.
*A01G 23/06* (2006.01)
(52) U.S. Cl.
CPC .................. *A01G 23/067* (2013.01)
(58) Field of Classification Search
CPC .............. A01G 23/06; A01G 23/067
See application file for complete search history.

(56) References Cited

U.S. PATENT DOCUMENTS

| 5,203,388 | A | 4/1993 | Bowling |
| 5,435,359 | A | 7/1995 | Craft |
| 5,829,497 | A | 11/1998 | Maroney |
| 5,996,657 | A | 12/1999 | Riesselman |
| 6,021,825 | A | 2/2000 | Bowling |
| 6,047,749 | A | 8/2000 | Lamb |
| 6,431,231 | B1 | 8/2002 | Braaten et al. |
| 6,832,277 | B2 | 12/2004 | Durham et al. |
| 7,150,300 | B1 | 12/2006 | Peterson |
| 7,398,805 | B2 | 7/2008 | Dubbs et al. |
| 8,584,717 | B2 | 11/2013 | Leonardi et al. |
| 9,462,759 | B2 | 10/2016 | Knipp et al. |
| 2008/0000208 | A1 | 1/2008 | Edwards |
| 2009/0101234 | A1 | 4/2009 | Hart |
| 2014/0311628 | A1 | 10/2014 | Miller |

*Primary Examiner* — Matthew Katcoff
(74) *Attorney, Agent, or Firm* — Ballard Spahr LLP

(57) ABSTRACT

A stump grinder is configured to mount to a portable machine that operably supports the stump grinder during a stump grinding procedure. The stump grinder includes a cutting wheel that is rotatably driven during the stump grinding procedure. The cutting wheel has a cutting surface to grind the stump by moving the rotating cutting wheel across the stump. A wheel stabilizing assembly is disposed between the portable machine and the drive system for supporting the drive system and cutting wheel. The cutting wheel is held in a generally vertical orientation and movement of the cutting wheel is biased relative to the portable machine. Accordingly, forces applied against the cutting surface of the cutting wheel during the grinding procedure are limited by the biased movement.

4 Claims, 8 Drawing Sheets

STUMP GRINDER WITH CUTTING WHEEL MOVING AND STABILIZING ASSEMBLY

CROSS REFERENCE TO RELATED APPLICATIONS

The present application is a continuation of U.S. application Ser. No. 15/197,869, filed Jun. 30, 2016, which claims the benefit of U.S. provisional application No. 62/197,870, filed Jul. 28, 2015, both of which are incorporated herein by reference in their entirety.

FIELD OF THE INVENTION

The present invention relates generally to the field of stump grinders with cutting wheels or discs, and more particularly to stump grinders that operate by moving a rotating cutting wheel or disc into and through a stump during a grinding procedure.

BACKGROUND OF THE INVENTION

It is generally known to equip a machine, such as a tractor, skid steer, or other vehicle or implement or the like, with a stump grinder that has a driven cutting wheel or disc designed to be used for grinding a stump. It is understood that such a stump grinder typically exerts forces against the stump via the cutting wheel during the grinding procedure for cutting, chipping, grinding, or otherwise removing the stump. In some instances, these forces may be excessive for the hardness or density of the stump, sharpness of the cutting wheel, rotational speed of the cutting wheel, or other operating condition, such that the cutting wheel may grab or stall or undergo torque or lateral forces that may damage the cutting wheel, the drive system that rotates the cutting wheel, or other components of the stump grinder or the corresponding machine equipped with the stump grinder.

SUMMARY OF THE INVENTION

The present invention provides a stump grinder with a cutting wheel moving and stabilizing assembly that is configured to provide a driven cutting wheel of the stump grinder with biased movement (such as, for example, in an axial direction via a parallel linkage with a torsion spring), while maintaining the cutting wheel in a generally vertical orientation. In doing so, force that is applied against the cutting surface of the cutting wheel during a grinding procedure (and the corresponding torque orthogonal to the rotational axis of the cutting wheel) is limited by the biased movement. A mounting frame of the stump grinder attaches to a portable machine that operates to support and move the stump grinder relative to the stump. The wheel stabilizing assembly (such as a parallel linkage and torsion spring configuration) is operably coupled between the mounting frame and the drive motor and cutting wheel for supporting the cutting wheel during operation of the stump grinder. The cutting wheel has teeth on at least one cutting surface or face or side of the cutting wheel that are configured to grind the stump by moving the rotating cutting wheel across the stump, such as in the axial direction of the cutting wheel.

Optionally, the wheel stabilizing assembly may have a movement mechanism or a multi-pivot linkage assembly, such as a parallel linkage, configured to allow the cutting wheel to move in a generally axial direction relative to the mounting frame, while maintaining the generally vertical orientation of the cutting wheel relative to the stump during the grinding procedure. Optionally, the wheel stabilizing assembly may include a biasing device, such as a torsion spring, that is configure to bias the movement of the cutting wheel via the movement mechanism, thereby cushioning the forces applied by the cutting wheel in the axial direction as the cutting wheel is urged against and through the stump. Optionally, the cutting wheel may have teeth on both sides or faces of the cutting wheel for grinding the stump by moving the cutting wheel back and forth across the stump in generally two opposing directions during the stump grinding procedure.

These and other objects, advantages, purposes and features of the present invention will become apparent upon review of the following specification in conjunction with the drawings.

DESCRIPTION OF THE PREFERRED EMBODIMENTS

Figure 8:
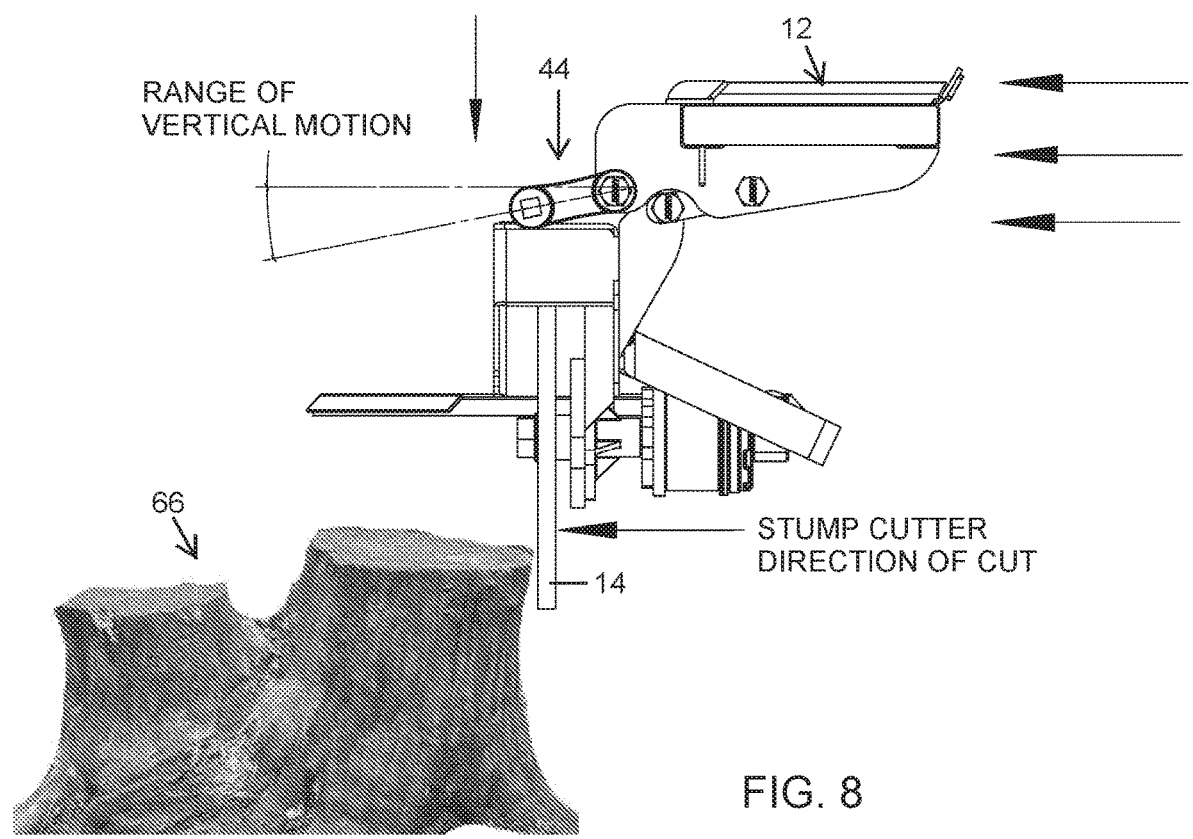
FIG. 8 is a side elevation view of the stump grinder shown in FIG. 1, illustrating the cutting wheel of the stump grinder in a home position and showing the direction of movement for grinding a stump.
Figure 9:
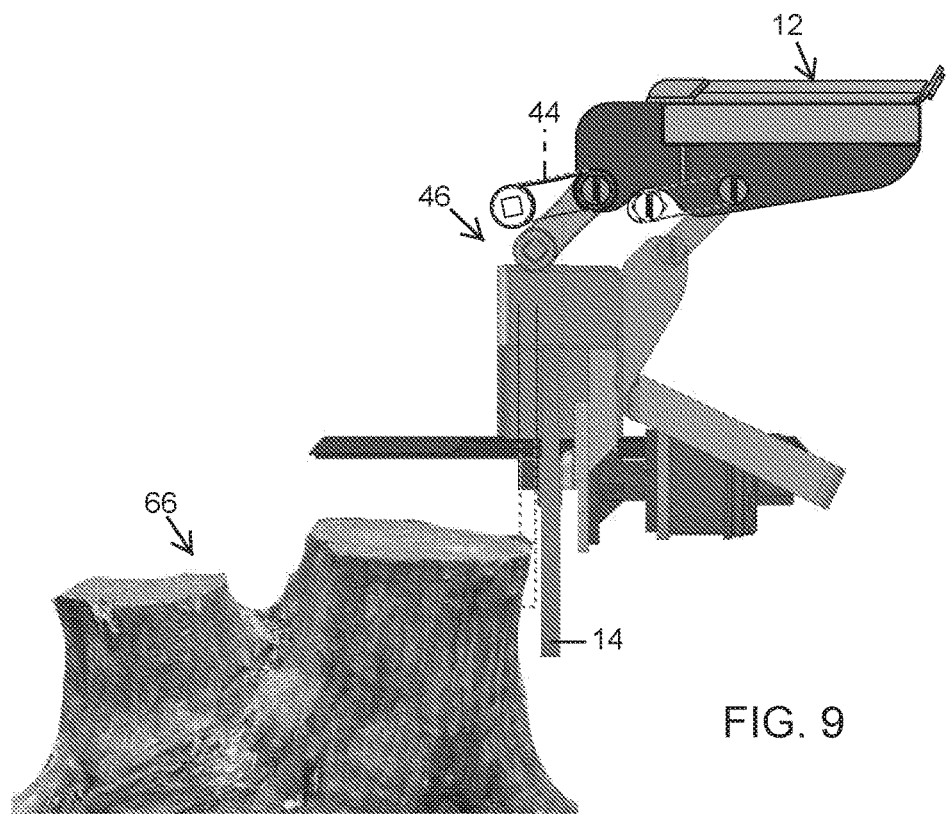
FIG. 9 is another side elevation view of the stump grinder shown in FIG. 8, showing the cutting wheel moved to an offset and lower position due to force exerted against the stump, with the cutting wheel remaining in a generally vertical orientation in accordance with the present invention.
Figure 10:
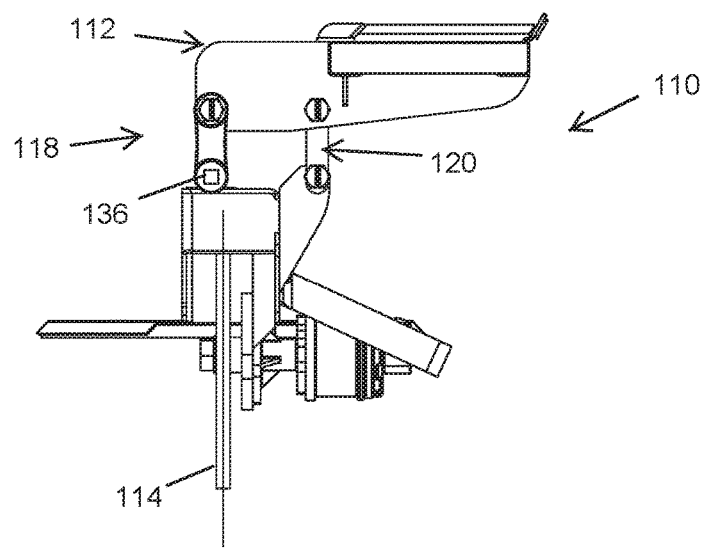
FIG. 10 is a side elevation view of another stump grinder in accordance with the present invention, showing the cutting wheel of the stump grinder in a home position.
Figure 11:
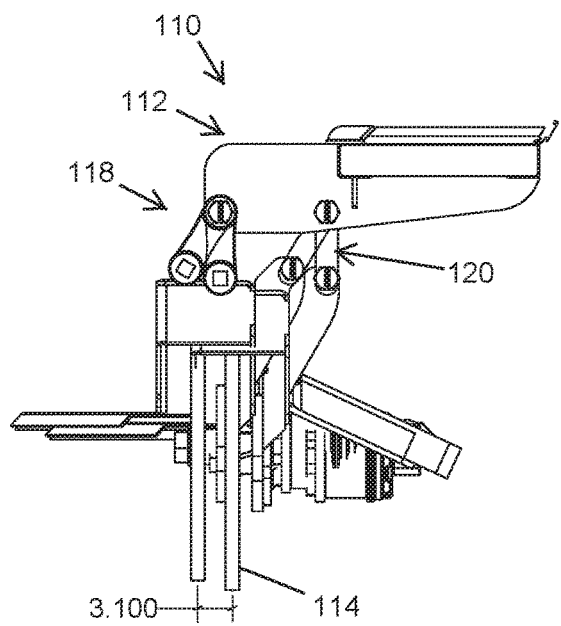
FIG. 11 is another side elevation of the stump grinder shown in FIG. 10, showing the cutting wheel of the stump grinder in an offset or loaded position.
Figure 12:
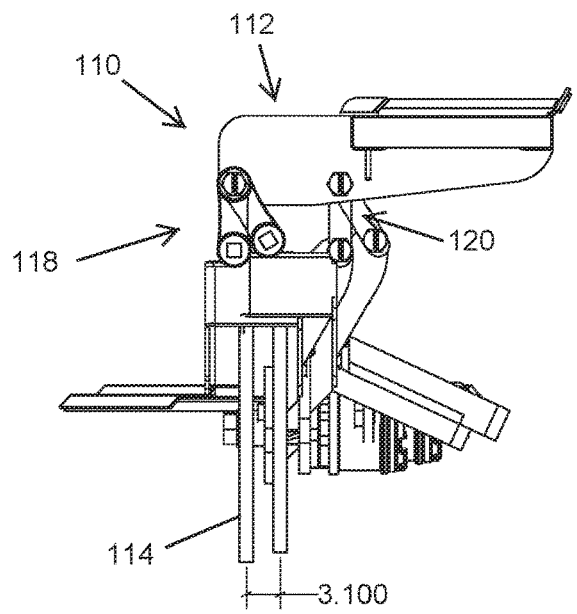
FIG. 12 is another side elevation of the stump grinder shown in FIG. 10, showing the cutting wheel of the stump grinder in an offset or loaded position in an opposite direction from that shown in FIG. 11.
Figure 13:
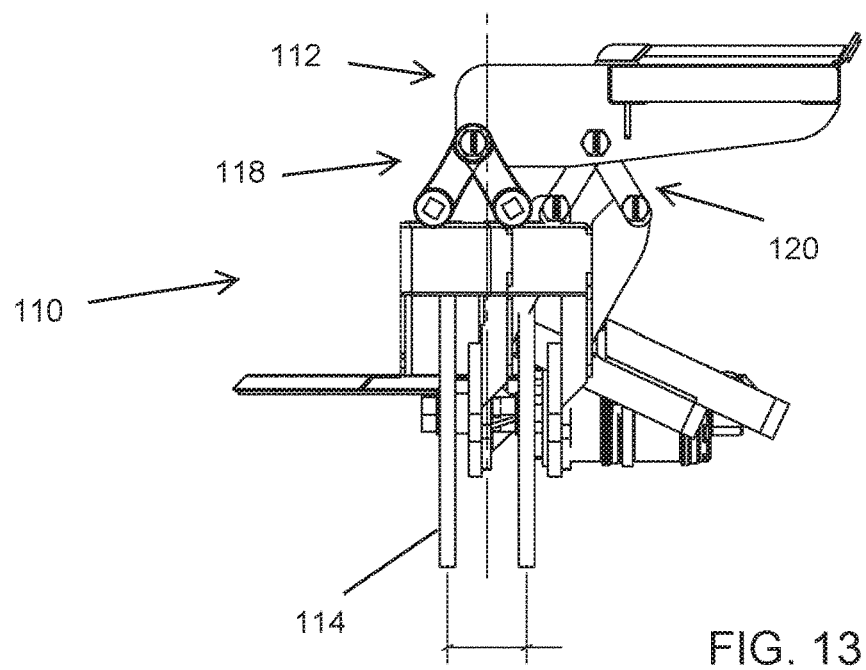
FIG. 13 is another side elevation of the stump grinder shown in FIG. 10, showing the cutting wheel of the stump grinder in opposing offset positions to show a range of movement of the cutting wheel.
Figure 14:
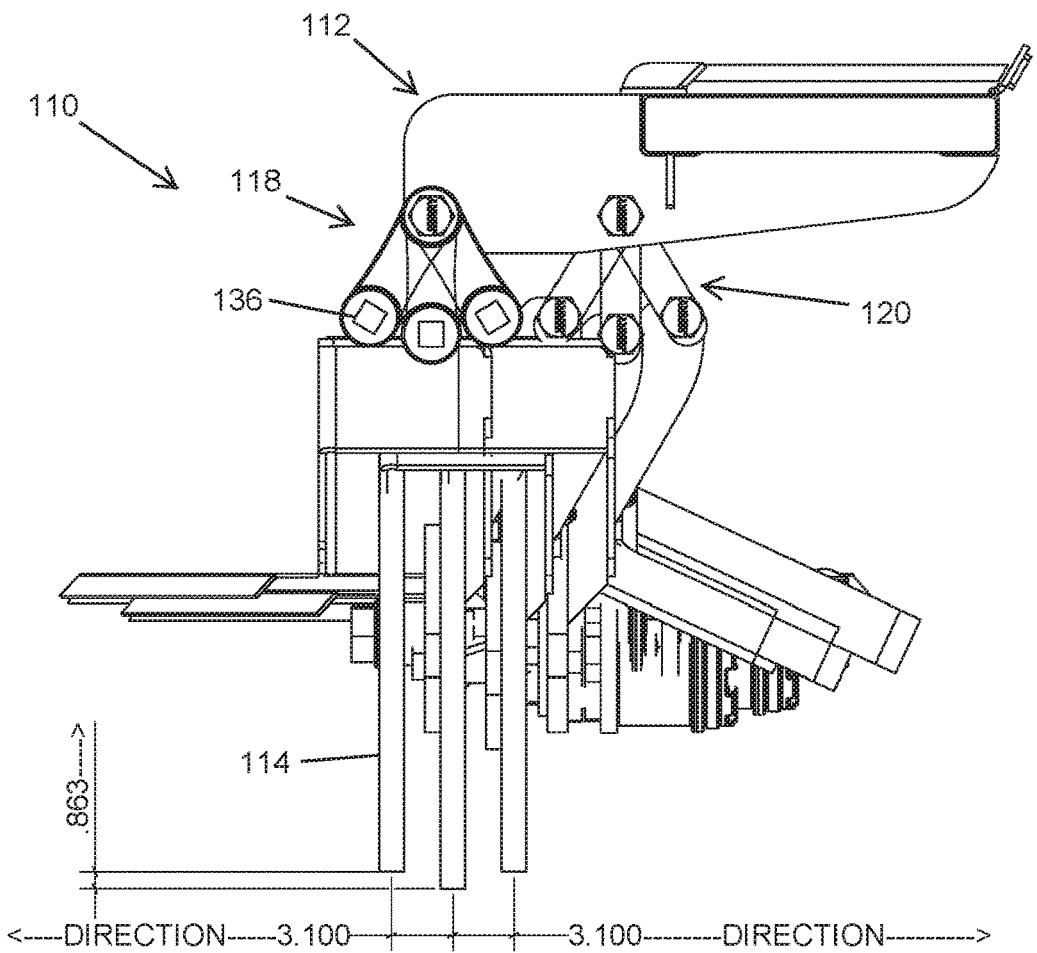
FIG. 14 is another side elevation of the stump grinder shown in FIG. 10, showing the home position of the cutting wheel and the opposing offset positions to also show the range of movement of the cutting wheel.

Referring now to the drawings and the illustrative embodiments depicted therein, a stump grinder 10 includes a mounting frame 12 that is configured to mount to a portable machine, such as a tractor, skid steer, or other vehicle or implement or the like, that operates to support and move the stump grinder 10 relative to a stump. A cutting wheel or disc 14 is supported by the mounting frame 12 and has teeth 16 on at least one cutting surface of the cutting wheel or disc 14 (such as the forward facing side or surface of the cutting wheel or disc that faces towards the stump that is to be cut, such as shown in FIG. 8) that are configured to grind the stump. The stump grinder 10 is equipped with a wheel stabilizing assembly 18 that is operably coupled between the mounting frame 12 and the cutting wheel or disc 14. The wheel stabilizing assembly 18 allows the cutting wheel or disc 14 to move in an axial direction (such as via a movement mechanism) relative to the mounting frame 12 against a biasing force (such as provided by a biasing device) that limits forces applied against a cutting side or face of the cutting wheel 14 during a stump grinding procedure. The wheel stabilizing assembly 18 also maintains the cutting wheel 14 in a generally vertical or upright orientation during and throughout a grinding procedure on a stump, such as where the cutting wheel 14 is driven in rotation and moved across the stump to grind, chip, or otherwise diminish the stump (FIGS. 8 and 9).

Figure 1:
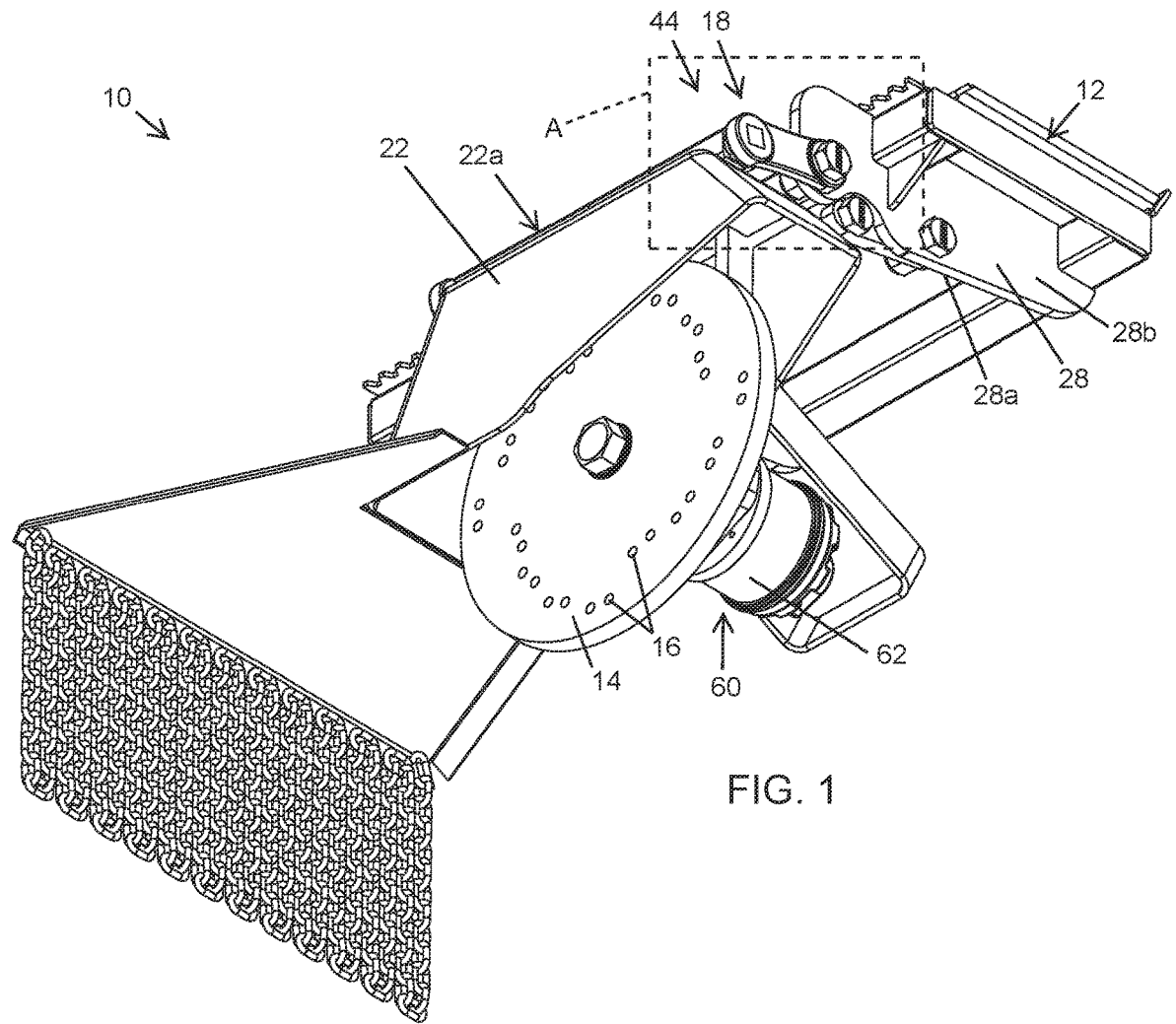
FIG. 1 is a lower perspective view of a stump grinder in accordance with the present invention.
Figure 2:
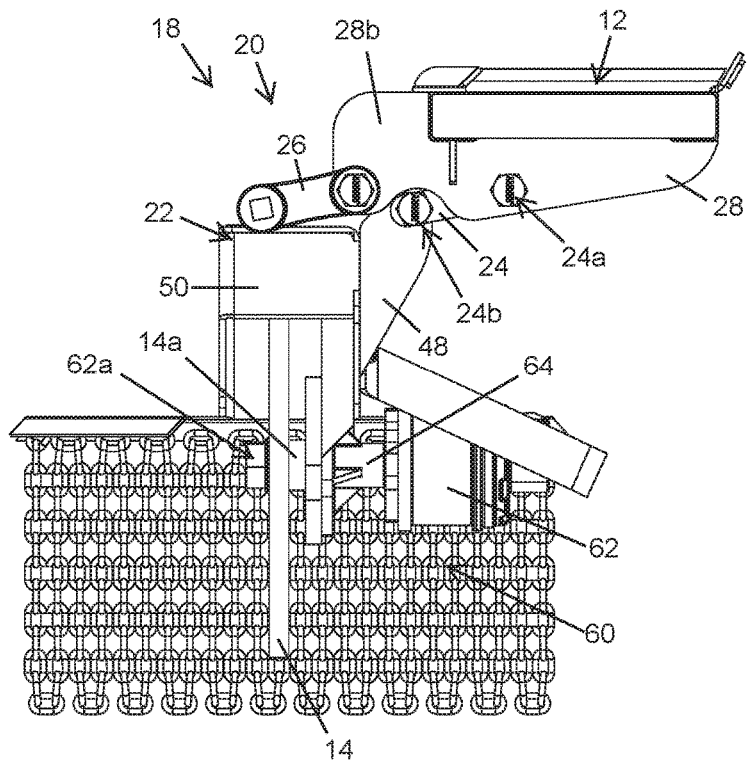
FIG. 2 is a side elevation view of the stump grinder shown in FIG. 1.

The stump grinder 10 includes a wheel housing 22 that may partially conceal and support the cutting wheel 14, such as by supporting the drive motor 62 attached to the cutting wheel 14. Thus, the wheel housing 22 may support at least a portion of a drive system 60 that is operably engaged with the cutting wheel 14 for rotating the cutting wheel about its generally horizontal rotational axis during the grinding procedure. The drive system, as shown in FIGS. 1 and 2, includes the drive motor 62, such as a hydraulic motor or the like, that is connected to the cutting wheel via a coupler or drive shaft 62a. The drive motor 62 may be fixedly mounted or secured to the wheel housing 22, such as to a sidewall 52 of the guard portion 50, via a mounting bracket 64 (FIG. 2). The drive shaft or axle 62a of the drive motor 62 extends through the sidewall 52 (such as through a bushing or bearing at the sidewall) and engages the cutting wheel 14, which may be secured to the drive shaft 62a at an end of the drive shaft 62a with a nut or other securing attachment. The cutting wheel 14 may be spaced from the wheel housing 22 by a bushing or spacer 14a, which may receive the drive shaft or axle 62a therethrough (and optionally, the end of the drive shaft may extend from the outer surface of the cutting wheel so as to engage an additional support of the housing so as to provide support of the drive shaft outboard of the cutting wheel). Thus, the drive motor 62 rotatably drives the drive shaft or axle 62a to rotate the cutting wheel 14, while a movement mechanism 20 moves the housing 22 and drive motor 62 and cutting wheel 14 relative to the mounting frame 12 to grind a stump, as discussed in detail below.

Figure 3:
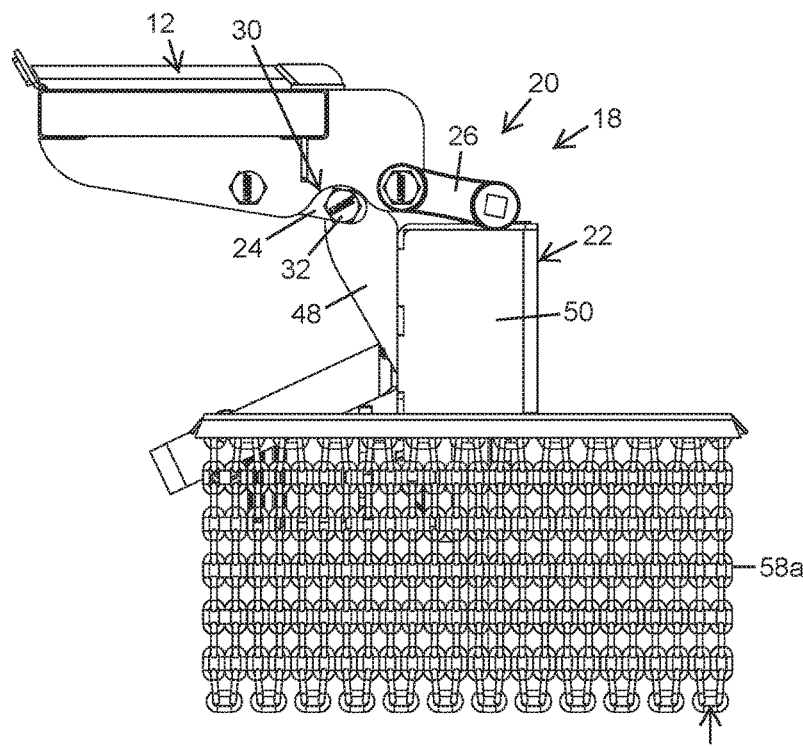
FIG. 3 is an opposite side elevation view of the stump grinder of FIG. 2.

As shown in FIGS. 1-3, the wheel stabilizing assembly includes the movement mechanism 20, which comprises a multi-pivot linkage assembly, such as a parallel four-bar linkage, attached between the mounting frame 12 and the wheel housing 22 that supports the drive motor 62 and cutting wheel 14. The movement mechanism 20 allows the cutting wheel 14 to move in a generally horizontal or axial direction (along the rotational axis of the cutting wheel) relative to the mounting frame 12, while maintaining the generally vertical or upright orientation of the cutting wheel 14 relative to the stump during the grinding procedure. It is also envisioned that the movement mechanism may alternatively include a slide assembly or other device that allows a cutting wheel to move in a generally axial direction relative to a mounting frame.

Figure 7:
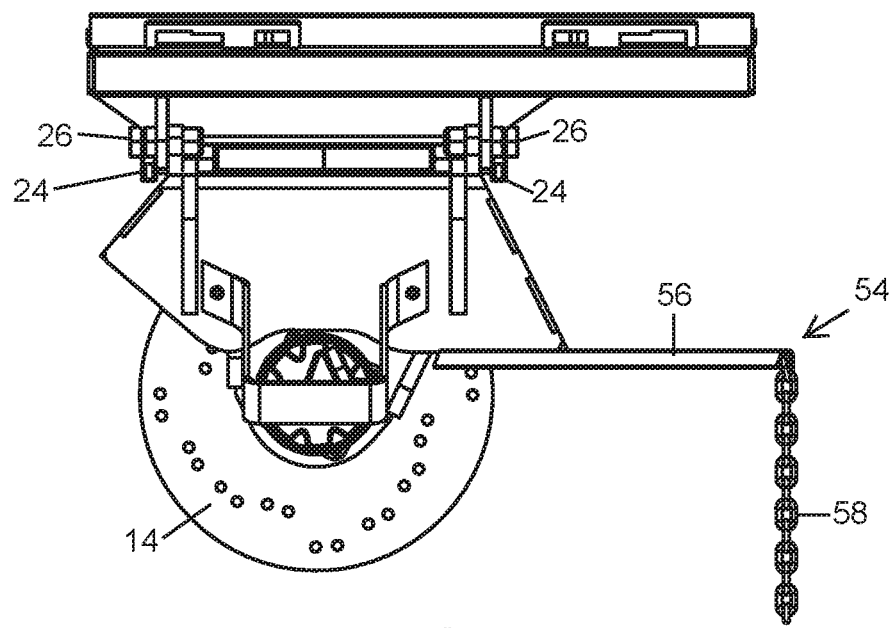
FIG. 7 is a rear elevation view of the stump grinder shown in FIG. 1.

In the illustrated embodiment, the multi-pivot linkage assembly of the movement mechanism 20 includes an inside link 24 and an outside link 26 that have substantially equal lengths and each pivotally attach between a lower bracket 28 or attachment portion of the mounting frame 12 and an upper portion of the wheel housing 22. The inside and outside links are provided at forward and rearward ends of the mounting frame 12 and the wheel housing 22, as shown in FIG. 7, such that a parallel linkage assembly is provided at opposing ends of the wheel housing 22.

Figure 1A:
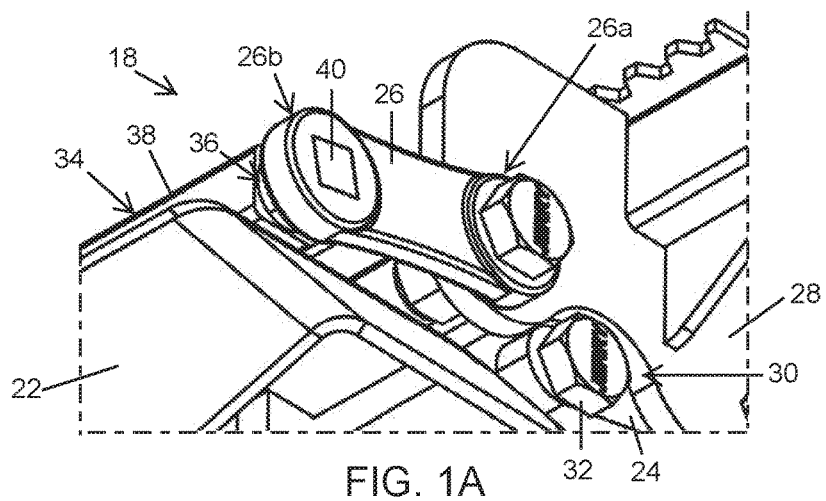
FIG. 1A is an enlarged view of a portion the stump grinder shown in FIG. 1, with the portion being shown at "A" in FIG. 1.
Figure 4:
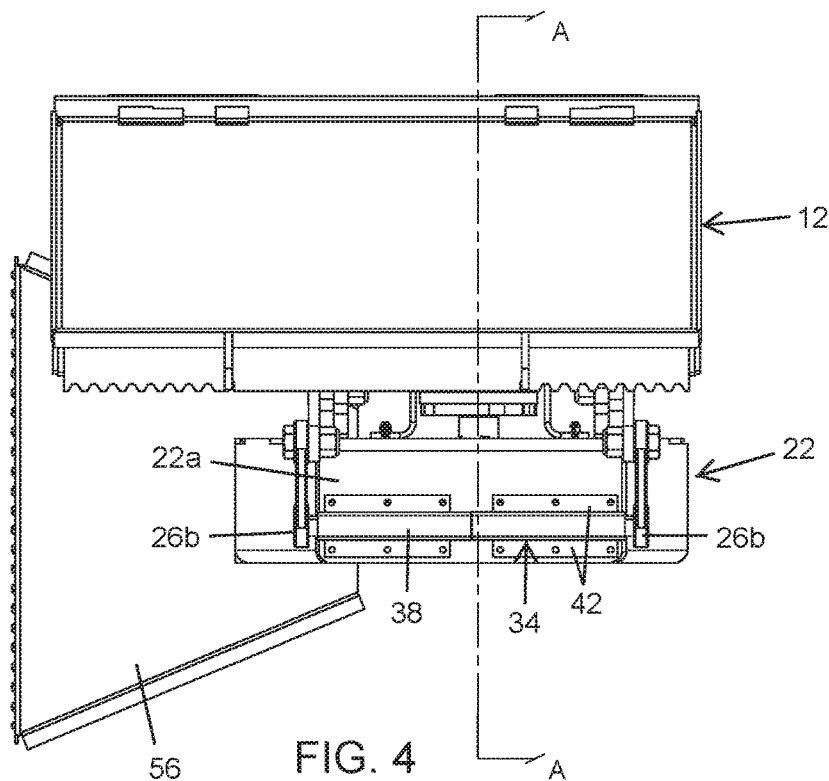
FIG. 4 is a top plan view of the stump grinder shown in FIG. 1.
Figure 5:
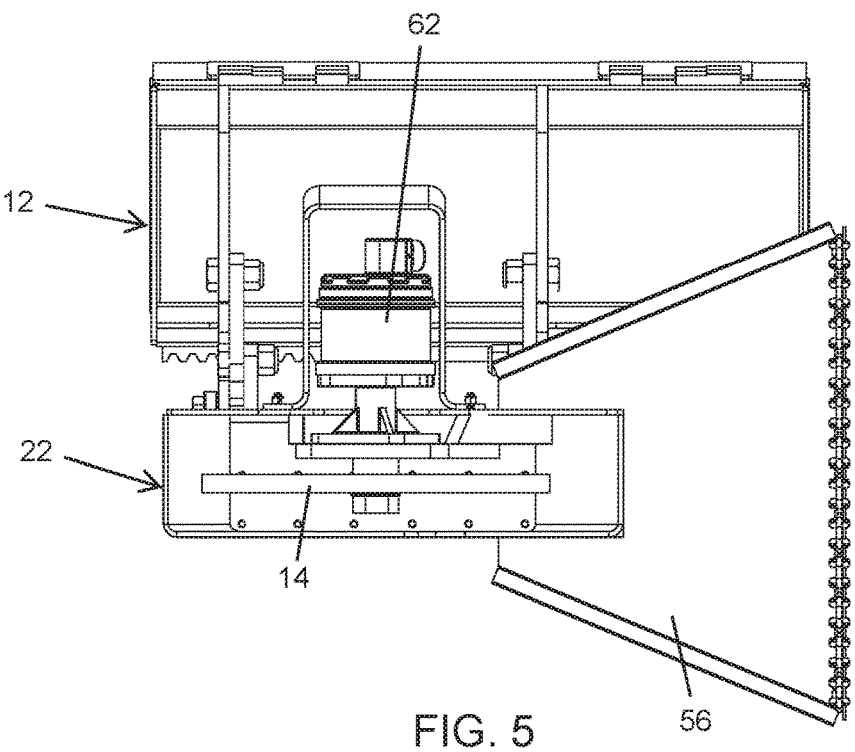
FIG. 5 is a bottom plan view of the stump grinder shown in FIG. 1.
Figure 4A:
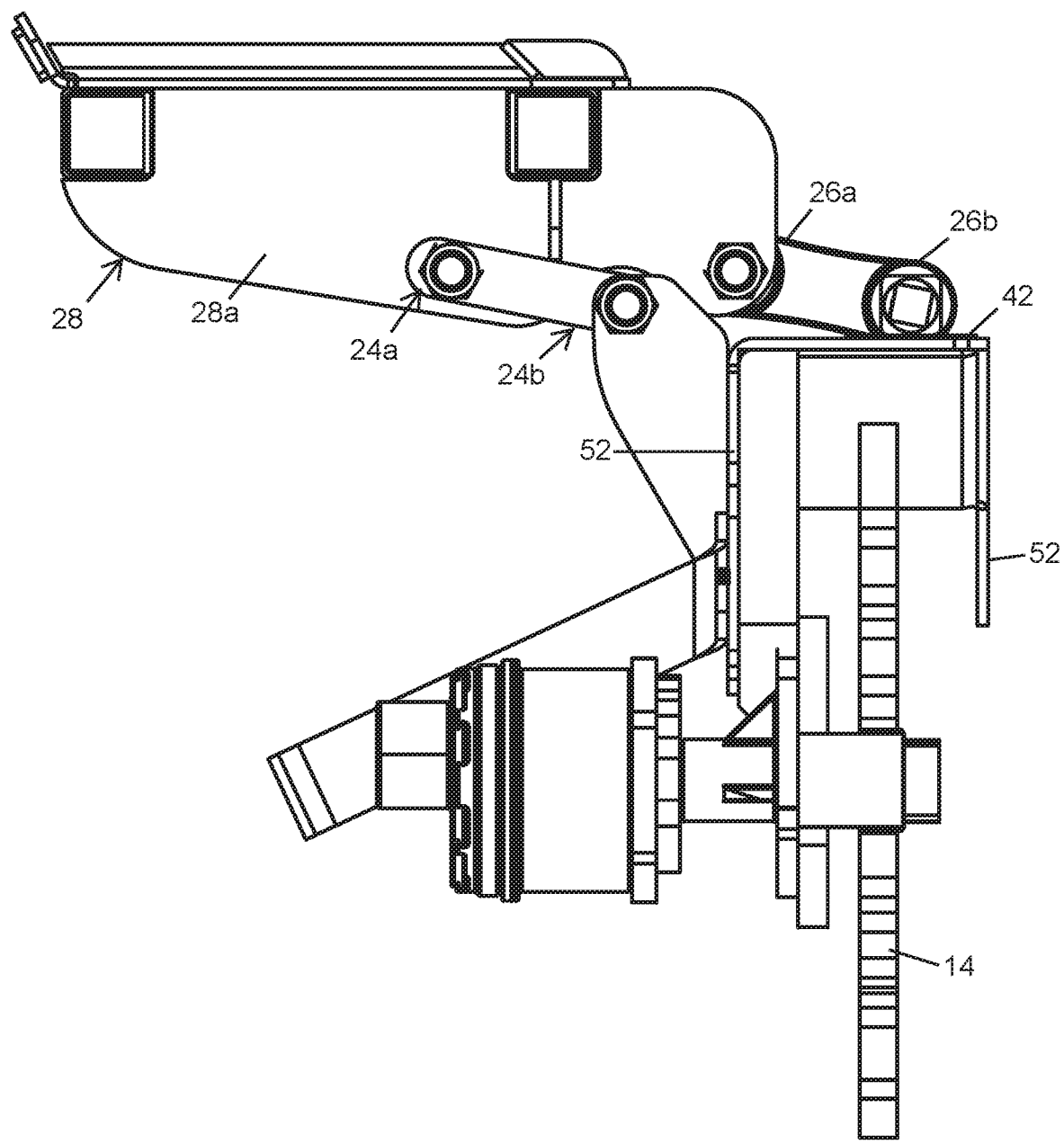
FIG. 4A is a partial sectional view taken generally along line A-A of FIG. 4.

As further shown in FIGS. 1-3, a lower end 24b of the inside link 24 is pivotally attached at an upper portion 22a of the wheel housing 22 and the upper end 24a of the inside link 24 is pivotally attached at a middle section of the lower bracket 28, arranging the upper end 24a of the inside link 24 inboard of an inside surface 28a of the lower bracket 28 (FIG. 4A). The upper end 26a of the outside link 26 is also pivotally attached at the lower bracket 28 (FIG. 1A), but is arranged outboard of an outside surface 28b of the lower bracket 28. Between the upper ends 24a, 26a of the inside and outside links 24, 26, the lower bracket 28 may include a notch or recess or cutaway area 30 that allows the lower end 24b of the inside link 24 to rotate upward into the cutaway area 30, as shown in FIGS. 1 and 1A. More specifically, a head 32 of a bolt that pivotally attaches the lower end 24b of the inside link 24 to the wheel housing 22 is positioned in contact with a lower surface of the cutaway area 30, thereby defining an end stop to the pivotal range of the illustrated four-bar linkage (FIGS. 8 and 9) when pivoting and moving the housing 22 and cutting wheel 14 in an upward and forward direction. The movement mechanism 20 may be provided with additional or alternative end stops to restrict or limit the pivotal range of the cutting wheel relative to the mounting frame. Optionally, the upper and lower ends of the links of the illustrated movement mechanism may be attached at the pivot joints with bolts, nuts, pins, rivets, or other fasteners or the like.

To provide a biasing force against movement effectuated by the movement mechanism 20, a biasing device 34, such as a torsion bar or spring, may be arranged with the movement mechanism, such as by attaching the biasing device 34 at one or more of the pivot joints of a multi-pivot linkage assembly. The biasing device 34 is configured to bias the movement of the cutting wheel 14 via the movement mechanism 20, thereby cushioning force applied by the cutting wheel 14 in the axial direction against the stump (FIGS. 8 and 9). Optionally, the biasing force provided by the biasing device 34 may be configured to provide substantially progressive resistance, whereby, as force is applied against the biasing force exerted by the biasing device, the biasing force increases proportionally. For example, as the cutting wheel 14 is urged against the stump, the spring resistance of the biasing device 34 may increase proportionally, such as at a linear or nonlinear rate, as the cutting wheel is moved further away from its initial position as the force is applied against the wheel by the stump. The biasing device 34 may also optionally have various different spring shapes and designs to provide the desired biasing force and rate of change in response to the movement of the cutting wheel and the applied force.

Referring again to FIGS. 1-3, the lower end 26b of the outside link 26 is attached to a torsion spring 36 that is mounted to the upper portion 22a of the wheel housing 22. The torsion spring 36 may include a rigid exterior casing 38 that is fixed to the upper portion of the wheel housing and a non-circular shaft 40 that is fixed to the lower end of the outside link, whereby the non-circular shaft extends within an interior volume of the casing and is restricted from rotating relative to the rigid exterior casing 38, such as by elastomeric elements disposed in the interior volume of the casing and engaging surfaces of the non-circular shaft. The torsion spring 36 may include base flanges 42 that extend from opposing sides of the rigid casing 38, as shown for example in FIG. 4, to rigidly attach at a generally planer surface along the upper portion 22*a* of wheel housing 22, such as with fasteners, welding, or the like. The stump grinder 10 may include one torsion spring 36 connected between the ends of a respective pair of linkages or may include two (or more) torsion springs connected between ends of respective pairs of linkages. The torsion spring 36 for the respective linkages on the forward (or optionally rearward) portion of the stump grinder 10 may be separate springs (one at each side linkage) or may be integrated as a single torsion spring, such as with a unitary non-circular shaft that extends between the ends of the respective linkages (such as between the outside links 26 at each side of the stump grinder). The biasing device 34 may additionally or alternatively include other springs or resilient materials to provide the biasing force against the movement of the cutting wheel 14.

The orientation of the biasing device or torsion spring 36, such as the shape and positioning of the elastomeric element and the shaft of the torsion spring 36, may define an unloaded or home position 44 of the cutting wheel 14 relative to the mounting frame, such as shown in FIGS. 1-8, where the housing 22 and cutting wheel 14 are biased towards and to the home position 44 when there is relatively little or no axial force exerted on the cutting wheel 14 (such as when the cutting wheel is not being urged or moved into or through a stump). When the torsion spring 36 is loaded due to axial force being exerted on the cutting wheel 14 (such as when the cutting wheel is being urged or moved into and through a stump during a grinding process), the cutting wheel 14 may move against or in opposition to the biasing force towards and to a loaded position 46, such as shown in FIG. 9. The stump grinder may be configured with the unloaded or home position of the cutting wheel oriented at any position within the range of movement provided by the movement mechanism, including a mid-range position (FIGS. 10-14) that would allow movement of the cutting wheel in either direction but would resist movement in either direction relative to the mid-range or home position (such as would be preferred for a cutting wheel configured with teeth of both sides to grind in both directions).

Figure 6:
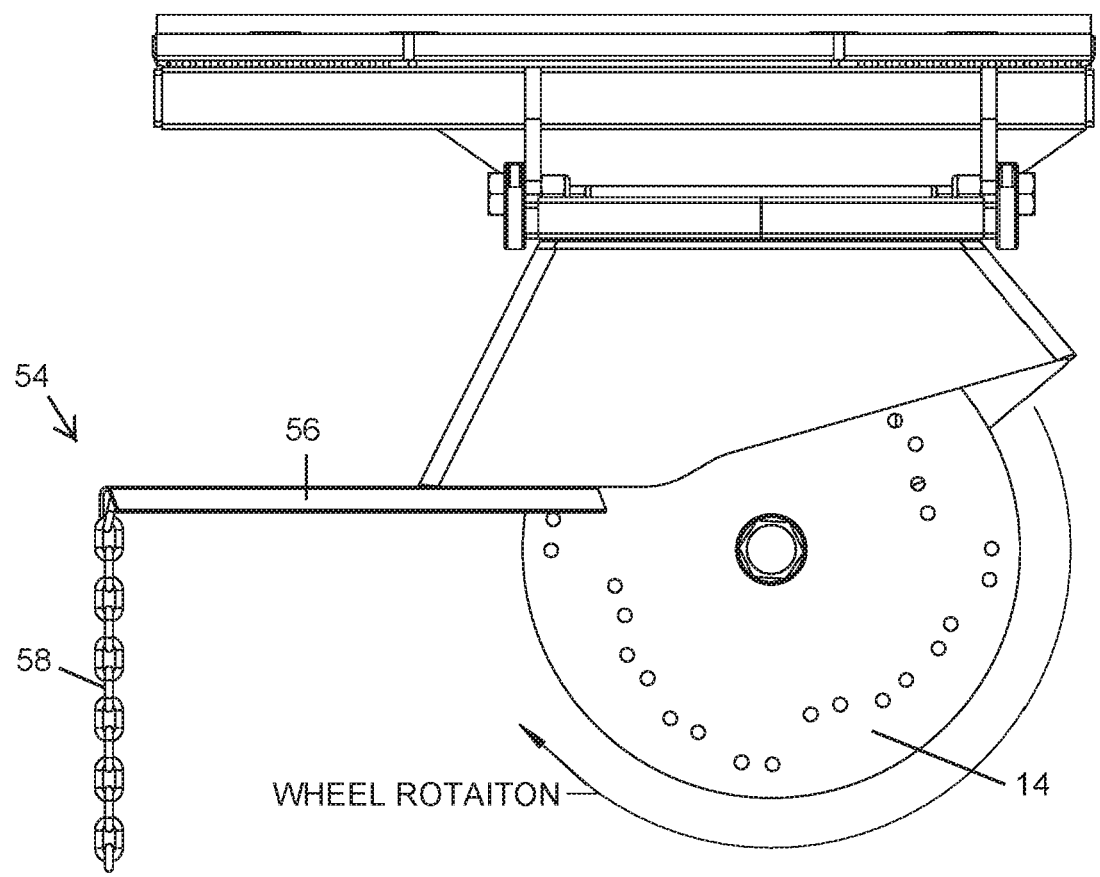
FIG. 6 is a front elevation view of the stump grinder shown in FIG. 1.

The upper portion 22*a* of the wheel housing 22 may include an extension bracket 48 that extends from a guard portion 50 of the wheel housing 22 to pivotally attach to the lower end 24*b* of the inside link 24, as shown in FIGS. 2 and 3. The guard portion 50 of the wheel housing is illustrated to have the generally planar surface along the upper portion with side walls 52 (FIG. 4A) that extend down from the upper portion on opposing sides of cutting wheel 14 to partially enclose or cover an upper section of the cutting wheel 14. The wheel housing 22 may also include a guard assembly 54 that includes a plate 56 that attaches to and extends rearward from a rear section of the wheel housing 22. The guard assembly 54 also may include a debris shield 58 that is supported by and hangs down from a rear edge portion of the guard plate 56, as shown in FIGS. 6 and 7. The debris shield 58 may be one or more chains that attach to the guard plate 56, such as at equal points on a single length of chain, to form strands of chain links 58*a* that hang down from the rear edge portion of the guard plate, as shown in FIG. 3. The debris shield of the guard assembly may optionally be an interwoven network of chainmail, a rubber reinforced flap, or other durable structure or material that absorbs and defects forces from debris that is generated by the cutting wheel. The guard assembly is configured to deflect flying debris that is generated during the grinding procedure in the rotational direction of the cutting wheel 14, such as shown in FIG. 6.

The cutting wheel 14, drive system 60, and wheel housing 22 are all supported by the wheel stabilizing assembly 18, such that the portable machine that operates the stump grinder 10 independently supports the cutting wheel 14 for performing the stump grinding procedure. As shown in FIGS. 8 and 9, the stump grinding procedure may involve moving the rotating cutting wheel 14 in the general axial direction of the cutting wheel 14, such that the teeth of the side or face of the cutting wheel 14 engage the stump 66. Should the resistive force of the stump 66 be greater than the biasing force of the wheel stabling assembly 18, as shown in FIG. 9, the movement mechanism 20 of the wheel stabling assembly will allow the cutting wheel 14 to move relative to the mounting frame 12, away from the stump 66, while maintaining the cutting wheel 14 in a generally vertical or upright orientation or plane. This results in the force applied against the cutting side or face of the cutting wheel 14 during the grinding procedure to be cushioned or otherwise limited by such biased movement in the general axial direction, and thus limiting or preventing the cutting wheel from grabbing or stalling. The corresponding twisting of the cutting wheel due to torque orthogonal to the rotational axis of the cutting wheel during the grinding procedure may also be limited by the biased movement.

The movement mechanism 20, as shown in FIGS. 8 and 9, provides a multi-pivot linkage that simultaneously moves or pivots the cutting wheel 14 in the vertical direction upon axial or horizontal movement of the cutting wheel 14 relative to the mounting frame 12. As illustrated in FIG. 9, the vertical movement of the cutting wheel 14 is generally downward when the cutting wheel moves from the home position 44 towards the loaded position 46. Optionally, the cutting wheel may move upward during movement from the home position towards the loaded position 46, such as if the biasing device was configured to bias the cutting wheel towards the lowered position shown in FIG. 9. With such a configuration, as the cutting wheel is urged against the opposing side of the stump from that engaged in FIG. 9, the cutting wheel 14 is moved upward towards the position shown in FIG. 8.

Optionally, the cutting wheel 14 may include teeth on each side or surface of the cutting wheel for grinding the stump by moving the cutting wheel sequentially or back and forth across the stump in generally two opposing axial directions during the stump grinding procedure. In such an embodiment, the biasing device may bias the cutting wheel in a mid-range position with freedom of movement in both directions, whereby the wheel stabilizing assembly would provide biased movement to the cutting wheel relative to the mounting frame for movement of the cutting wheel in both opposing directions across the stump.

Optionally, a stump grinder may have a parallel linkage multi-pivot movement mechanism that has the links generally vertical when in a home position, whereby the links may pivot in either direction during operation of the stump grinder, with the cutting wheel having teeth on both surfaces so as to grind a stump as the stump grinder is moved in either direction across and through the stump. For example, and such as shown in FIGS. 10-14, a stump grinder 110 includes a mounting frame 112 that is configured to mount to a portable machine, such as a tractor, skid steer, or other vehicle or implement or the like, that operates to support and move the stump grinder 110 relative to a stump. A cutting wheel or disc 114 is supported by the mounting frame 112 and has teeth on one or both cutting surfaces. The stump grinder 110 is equipped with a wheel stabilizing assembly 118 that is operably coupled between the mounting frame 112 and the cutting wheel or disc 114. The wheel stabilizing assembly 118 allows the cutting wheel or disc 114 to move in an axial or horizontal direction (such as via a movement mechanism) relative to the mounting frame 112 against a biasing force (such as provided by a biasing device) that limits forces applied against a cutting side or face of the cutting wheel 114 during a stump grinding procedure, such as in a similar manner as discussed above. The wheel stabilizing assembly 118 also maintains the cutting wheel 114 in a generally vertical or upright orientation during and throughout a grinding procedure on a stump, such as where the cutting wheel 114 is driven in rotation and moved generally horizontally across the stump to grind, chip, or otherwise diminish the stump.

In the illustrated embodiment of FIGS. 10-14, the wheel stabilizing assembly 118 includes a movement mechanism 120 that includes a multi-pivot linkage assembly, such as a parallel four-bar linkage, attached between the mounting frame 112 and a wheel housing that supports the drive motor and cutting wheel 114. The movement mechanism 120 allows the cutting wheel 114 to move in a generally axial or horizontal direction relative to the mounting frame 112, while maintaining the generally vertical orientation of the cutting wheel 114 relative to the stump during the grinding procedure. The height of the cutting wheel increases as the wheel is moved from the centered or home position, which also may assist in reducing the forces exerted by the stump at the wheel during the stump grinding process, since less of the wheel 114 may be engaged with the stump as the wheel is moved from the centered or home position.

As can be seen with reference to FIGS. 10-14, the cutting wheel 114 is swung or pivoted or moved through a range of movements in either direction from its centered or home position (FIG. 10), all while maintaining the cutting wheel in a generally vertical orientation. The parallel linkages include a torsion spring 136 (such as in a similar manner as discussed above) that biases or urges the linkages (and the cutting wheel) towards the home or centered position. During operation of the stump grinder, the torsion spring 136 may resist movement of the cutting wheel 114 from its centered position, but will allow such movement as the forces acting against the cutting wheel increase to a threshold amount that overcomes the resistive force applied by the torsion spring, thereby allowing the cutting wheel 114 to move or swing or pivot as the cutting wheel is pushed into and through the stump. For example, when the stump grinder is moved forward (to the left in FIGS. 10-14), the torsion spring will resist but allow movement of the parallel linkages to allow the cutting wheel to swing to the right direction (FIG. 12) relative to the mounting frame (in reality, the cutting wheel does not move relative to the stump, but the mounting frame may move in the left direction relative to the cutting wheel when the forces at the face of the cutting wheel overcome the torsional spring). Similarly, when the stump grinder is moved rearward (to the right in FIGS. 10-14), the torsion spring will resist but allow movement of the parallel linkages to allow the cutting wheel to swing to the left direction (FIG. 11) relative to the mounting frame (again, in reality, the cutting wheel does not move relative to the stump, but the mounting frame may move in the right direction relative to the cutting wheel when the forces at the face of the cutting wheel overcome the torsional spring). The stump grinder 110 thus allows for movement of the grinding wheel in either direction so that the cutting wheel can be pushed in either direction towards and into and through a stump. The stump grinder 110 may otherwise be similar to the stump grinder 10, discussed above, such that a detailed discussion of the stump grinders need not be repeated herein.

Therefore, the present invention provides a stump grinder that has a cutting wheel support and movement mechanism that maintains the cutting wheel in a generally vertical orientation during and throughout a stump grinding process. The movement mechanism includes a biasing element or device that biases the cutting wheel relative to the mounting frame in a home position, whereby the cutting wheel, as it is moved into and through a stump that is being ground, moves against the biasing force of the biasing element to limit over movement or excessive forces from being exerted at the cutting surface of the cutting wheel during the stump grinding process, with such movement occurring while the cutting wheel is maintained in a generally vertical orientation or plane. Thus, the stump grinder of the present invention limits jarring or excessive forces that may otherwise be exerted against the cutting wheel during the stump grinding procedure.

Changes and modifications in the specifically described embodiments may be carried out without departing from the principles of the present invention, which is intended to be limited only by the scope of the appended claims as interpreted according to the principles of patent law.

The invention claimed is:

1. A stump grinder configured to mount to a portable machine that operably supports the stump grinder, said stump grinder comprising:
   a mounting frame configured to attach to a portable machine;
   a cutting wheel having a rotational axis and at least one cutting surface configured to grind a stump by rotating and moving said cutting wheel across the stump; a drive system operably engaged with said cutting wheel for rotating said cutting wheel about the rotational axis; and
   a wheel stabilizing assembly disposed between said mounting frame and said drive system, wherein said wheel stabilizing assembly comprises (i) a slide assembly configured to allow said cutting wheel to move in a generally axial direction relative to said mounting frame, while substantially maintaining said cutting wheel in a generally upright orientation, and (ii) a spring configured to bias movement of said cutting wheel via the slide assembly, thereby cushioning forces applied by said cutting wheel in the axial direction against the stump.

2. The stump grinder of claim 1, wherein said at least one cutting surface is disposed at a face of said cutting wheel generally orthogonal to the rotational axis of said cutting wheel.

3. The stump grinder of claim 1, wherein said slide assembly comprises a multi-pivot linkage assembly pivotally coupled between said mounting frame and a wheel housing that supports said drive system.

4. The stump grinder of claim 1, wherein said spring comprises a torsion spring coupled with said slide assembly.

\* \* \* \* \*